United States Patent
Sloane et al.

(10) Patent No.: US 10,536,857 B1
(45) Date of Patent: Jan. 14, 2020

(54) SYSTEMS AND METHODS FOR PRE-AUTHENTICATING A USER ON A MOBILE DEVICE

(71) Applicant: Bank of America Corporation, Charlotte, NC (US)

(72) Inventors: Brandon Sloane, Charlotte, NC (US); Monika Kapur, Jacksonville, FL (US); Crystal M. Sundaramoorthy, Charlotte, NC (US); Ryan Davis, Charlotte, NC (US); Kevin A. Delson, Woodland Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/449,571

(22) Filed: Jun. 24, 2019

(51) Int. Cl.
*H04W 12/06* (2009.01)
*G06F 21/32* (2013.01)
(Continued)

(52) U.S. Cl.
CPC ........ *H04W 12/0602* (2019.01); *G06F 9/445* (2013.01); *G06F 9/44505* (2013.01); *G06F 9/44578* (2013.01); *G06F 9/451* (2018.02); *G06F 21/32* (2013.01); *H04W 12/00502* (2019.01); *H04W 84/025* (2013.01)

(58) Field of Classification Search
CPC .. G06F 9/445; G06F 9/44505; G06F 9/44578; G06F 21/32; G06F 12/0862; G06N 20/00; G06Q 20/40145; G06K 9/00006; H04L 63/0861
See application file for complete search history.

(56) References Cited

U.S. PATENT DOCUMENTS 8,243,596 B2  8/2012  Fedders et al.
8,244,874 B1  8/2012  Thireault
(Continued)

OTHER PUBLICATIONS

Mary Shacklett, "Edge Computing: A Cheat Sheet," https://www.techrepublic.com/article/edge-computing-the-smart-persons-guide/, Jul. 21, 2017.

(Continued)

*Primary Examiner* — Dung Hong
(74) *Attorney, Agent, or Firm* — Weiss & Arons LLP; Michael A. Springs, Esq.

(57) ABSTRACT

A method for pre-authenticating a user on the user's mobile device is provided. The method may be implemented on the device. The method may include tracking commonly accessed applications over a pre-determined amount of time. The method may include tracking and storing on the mobile device, application data associated with each commonly accessed application. When a determined current time of day is a pre-determined amount of time prior to the tracked start time of access to a one or more commonly accessed applications, the method may include capturing, autonomously, via each of a plurality of sensors, an attribute associated with the user. The method may further include comparing a value of the attribute captured to a historically stored attribute value. The method may further include verifying and pre-authenticating the user based on the comparing. The method may also include pre-loading the user's mobile device with the commonly accessed application.

20 Claims, 5 Drawing Sheets

(51) Int. Cl.
*H04W 84/02* (2009.01)
*H04W 12/00* (2009.01)
*G06F 9/451* (2018.01)
*G06F 9/445* (2018.01)

(56) References Cited

U.S. PATENT DOCUMENTS

| | | | | |
|---|---|---|---|---|
| 8,604,906 B1* | 12/2013 | Halferty | ................... | G05B 1/01 340/5.83 |
| 9,900,725 B2 | 2/2018 | Young et al. | | |
| 10,235,878 B2 | 3/2019 | Li | | |
| 10,346,825 B2* | 7/2019 | Sarin | ................ | G06Q 20/40145 |
| 2005/0180618 A1* | 8/2005 | Black | ................ | G06F 3/03545 382/124 |
| 2006/0192709 A1 | 8/2006 | Schantz et al. | | |
| 2012/0137296 A1* | 5/2012 | Chen | ....................... | G06F 9/445 718/100 |
| 2012/0167122 A1* | 6/2012 | Koskimies | ............ | G06F 9/5027 719/328 |
| 2012/0324481 A1* | 12/2012 | Xia | ......................... | G06F 9/485 719/320 |
| 2013/0145457 A1* | 6/2013 | Papakipos | ........... | G06F 21/6245 726/19 |
| 2015/0026415 A1* | 1/2015 | Clausen | .............. | G06F 12/0862 711/137 |
| 2016/0072802 A1* | 3/2016 | Hoyos | ................. | H04L 63/0861 726/5 |
| 2018/0052492 A1* | 2/2018 | Okvist | .................. | G06F 1/1643 |
| 2018/0121891 A1 | 5/2018 | Hosny et al. | | |
| 2018/0167445 A1 | 6/2018 | Speight et al. | | |
| 2018/0181963 A1* | 6/2018 | Birukov | ........... | G06Q 20/40145 |
| 2018/0293087 A1* | 10/2018 | Lee | ........................ | G06F 3/0488 |
| 2018/0367314 A1 | 12/2018 | Egner et al. | | |
| 2018/0374100 A1* | 12/2018 | Zhou | .................. | G06Q 20/3276 |
| 2019/0026450 A1 | 1/2019 | Egner et al. | | |
| 2019/0138919 A1* | 5/2019 | Chen | ...................... | G06N 20/00 |
| 2019/0155619 A1* | 5/2019 | Chen | ................... | G06F 9/44505 |
| 2019/0155622 A1* | 5/2019 | Chen | ........................ | G06F 3/08 |
| 2019/0156207 A1* | 5/2019 | Chen | ................... | G06N 3/0445 |
| 2019/0188000 A1* | 6/2019 | Chen | ...................... | G06F 9/445 |
| 2019/0188005 A1* | 6/2019 | Chen | ................... | G06F 9/4451 |
| 2019/0188007 A1* | 6/2019 | Chen | ................... | G06F 9/44505 |
| 2019/0188595 A1* | 6/2019 | Chen | ...................... | G06N 7/005 |
| 2019/0196849 A1* | 6/2019 | Chen | ...................... | G06F 9/4491 |
| 2019/0230186 A1* | 7/2019 | Yellin | ................. | G06F 9/44505 |
| 2019/0281049 A1* | 9/2019 | Scheller | ................ | H04L 63/102 |

OTHER PUBLICATIONS

Paul Miller, "What is Edge Computing?" https://www.theverge.com/circuitbreaker/2018/5/7/17327584/edge-computing-cloud-google, May 7, 2018.

"What is Edge Computing," https://www.ge.com/digital/blog/what-edge-computing, GE Digital, Retrieved on May 16, 2019.

* cited by examiner

| | TIME | FREQUENCY | APP/WEB PAGE | DATA |
|---|---|---|---|---|
| 402<br>APPLICATION 1 | 08:59 AM | MON - 10/01 | www.bank.com/<br>account balance | Username: Joezz<br>Pass: 888*!<br>Acct# 44433324433 |
| | 09:01 AM | TUES - 10/01 | | |
| | 09:01 AM | WED - 10/03 | | |
| 404<br>APPLICATION 2 | 05:59 PM | MON - 10/01 | www.weather.com | City: Texas<br>Type: Hourly Weather |
| | 05:58 PM | TUES - 10/02 | | |
| | 06:00 PM | WED - 10/03 | | |
| 406<br>APPLICATION 3 | 10:05 PM | MON - 10/04 | www.grocery.com | User: Joe<br>Pass: 1122*4<br>Product: Milk-Blue<br>Product: Organic Egg<br>Product: Soy Yogurt |
| | — | — | | |
| | — | — | | |

FIG. 4

SYSTEMS AND METHODS FOR PRE-AUTHENTICATING A USER ON A MOBILE DEVICE

FIELD OF TECHNOLOGY

Aspects of the disclosure relate to edge computing. Specifically, aspects of the disclosure relate to pre-authenticating a user using edge computing.

BACKGROUND OF THE DISCLOSURE

Many people use their personal mobile devices to access applications associated with shopping, viewing personal information and retrieving news. Applications may include webpages, mobile apps and other suitable applications.

Some applications are accessed more frequently than other applications. For example, some applications are accessed once a week. Other applications are accessed daily and even more than once a day. Yet, there are those applications that are accessed unpredictably.

Furthermore, these applications typically require at least a person's login information. In some more secure applications, additional levels of secure authentication may be required.

In order to load a webpage with a specific user's information, the website may be required to contact a number of different resources and retrieve the pertinent information regarding that specific user. This retrieval of information may be time consuming. The retrieval of information may cause the webpage to take a considerable amount of time to load the relevant information. If the webpage takes a considerable amount of time to load the user may become frustrated.

It would be desirable, therefore, to provide systems and methods using edge computing for pre-loading applications that are commonly accessed by a user at the time the user typically would typically access the application. It would further be desirable to pre-authenticate the user to the pre-loaded application.

SUMMARY OF THE DISCLOSURE

Aspects of the disclosure relate to a method for pre-authenticating a user on the user's mobile device. The method may be using a plurality of sensors. The sensors may be located on the user's mobile device. The sensors may be smart sensors.

The method may include tracking a group of commonly accessed applications over a pre-determined amount of time. The method may also include tracking, for each commonly accessed application, application data. The application data may include a start time of day the user accesses the application. The application data may include frequency of access to the application. The application data may further include real-time data needed when accessing the application.

The method may include storing the application data on the user's mobile device.

When a determined current time of day is a pre-determined amount of time prior to the tracked start time of access to a one or more commonly accessed applications, the method may include capturing, autonomously, via each sensor, an attribute associated with the user. The captured attributes may be necessary for authentication of the user to the application on the mobile device.

In response to the capture of the attributes, via each sensor, the method may include comparing, a value of the attribute captured by each sensor to a historically stored attribute value previously captured by each sensor.

The method may further include verifying and pre-authenticating the user based on the comparing. Once the user is pre-authenticated, the method may include pre-loading the user's mobile device with the commonly accessed application. The pre-loading may be based, at least in part, on the stored application data.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 4 shows an illustrative diagram in accordance with principles of the invention.

DETAILED DESCRIPTION OF THE DISCLOSURE

Figure 1:
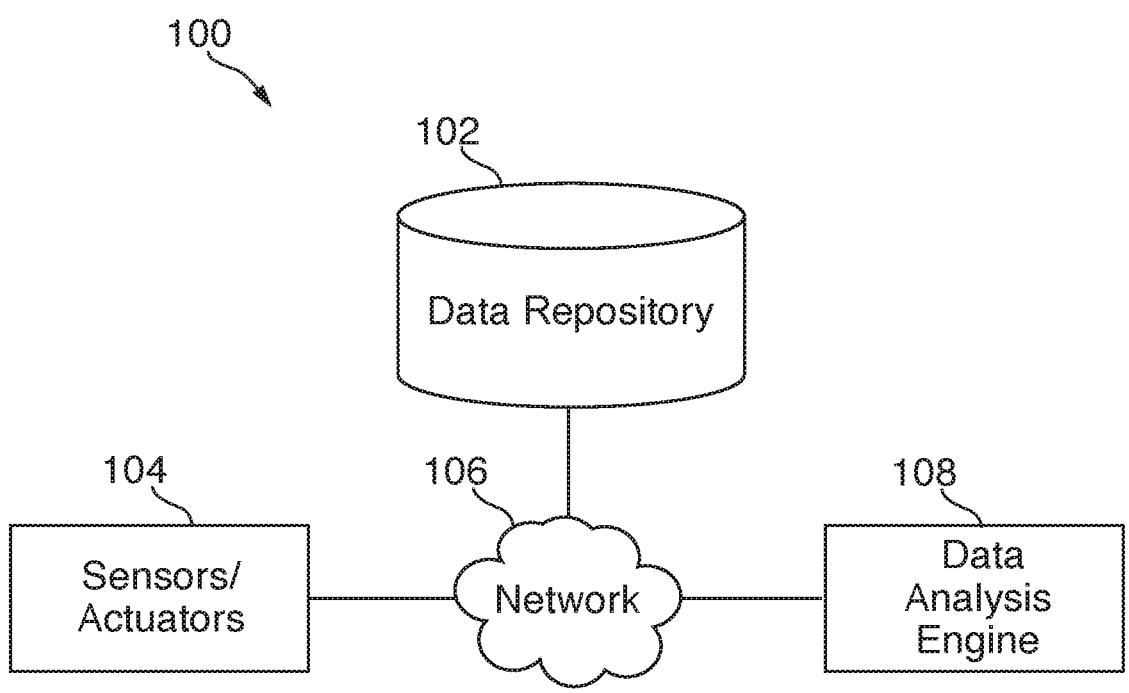
FIG. 1 shows illustrative system components in accordance with principles of the invention.

An edge computing system located on a user's mobile device for pre-authenticating a user on the mobile device is provided. The mobile device may include but is not limited to, a smartphone, smartwatch, other suitable smart devices, a laptop and a tablet.

The system may include a plurality of sensors. The plurality of sensors may be located on the mobile device. The sensors may be smart sensors. Smart sensors may include a sensor, microprocessor and electronic communication capabilities.

The system may also include one or more edge-nodes. The edge-node may include a local data analysis engine on the mobile device.

An edge-node may be a node on the periphery or edge of a network. An illustrative network may be an internet-of-things ("IoT") network. An IoT network may include one or more nodes. Each node may include two or more nodes.

Nodes positioned close to the source of generated data and having sufficient computational power to process the data may be termed "edge-nodes." Edge-nodes may integrate sensing capabilities, actuating capabilities, data connectivity and/or computing capacities.

Edge-nodes may control sensors, actuators, embedded devices and other nodes. Edge-nodes, or the nodes they control, may not be continuously connected to a network. Edge-nodes may provide computational resources positioned near the source of captured data or near an operating environment. Processing data using edge-nodes may reduce the communication bandwidth needed to transmit data from a node to a cloud computing environment.

Utilizing edge-nodes to process data may improve security of a network. For example, a network breach may be detected by an edge-node. The intrusion may be quarantined by or at the edge-node and prevent the breach from compromising the entire network.

Edge-nodes may run encryption algorithms and store biometric information locally. Such dispersion of security protocols may reduce risk of any user's security information being comprised. Utilizing edge-nodes may disperse processing power needed to run the security or encryption algorithms.

Utilizing edge-nodes may improve reliability of a network. For example, edge-nodes with machine learning capabilities may detect operational degradation in nodes, equipment, and infrastructure deployed within an operating environment. Early detected degradation may be cured before developing into full-blown failures.

Generally, edge-nodes may include a processor circuit. The processor circuit may control overall operation of an edge-node and its associated components. A processor circuit may include hardware, such as one or more integrated circuits that form a chipset. The hardware may include digital or analog logic circuitry configured to perform any suitable (e.g., logical) computing operation.

A edge-node may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, computer executable instructions, electronic signatures of biometric features or any other suitable information or data structures. Components of a node may be linked by a system bus, wirelessly or by other suitable interconnections. Edge-node components may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable an edge-node to perform various functions. For example, the non-transitory memory may store software applications used by an edge-node, such as an operating system, application programs, and an associated database. Alternatively, some or all of computer executable instructions of an edge-node may be embodied in hardware or firmware components of the edge-node.

Software application programs, which may be used by an edge-node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

An edge-node may support establishing network connections to one or more remote nodes. Such remote nodes may be edge-nodes, sensors, actuators or other computing devices. Edge-nodes may be personal computers or servers. An edge-node may communicate with other nodes using a data port. The data port may include a network interface or adapter. The communication circuit may include the modem. The data port may include a communication circuit. An edge-node may include a modem, antenna or other communication circuitry for establishing communications over a network, such as the Internet. The communication circuit may include the network interface or adapter.

Via the data port and associated communication circuitry, an edge-node may access network connections and communication pathways external to the edge-node. Illustrative network connections may include a local area network ("LAN") and a wide area network ("WAN"), and may also include other networks. Illustrative communication pathways may include WiFi, wired connections, Bluetooth, cellular networks, satellite links, radio waves, fiber optic or any other suitable medium for carrying signals.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Edge-nodes may include various other components, such as a display, battery, speaker, and antennas. Edge-nodes may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A sensor may also be a node. A sensor may detect changes in attributes of a physical or virtual operating environment. For example sensors may measure attributes such as audio, rainfall, movement, temperature, water levels or activity of other sensors. Sensors may measure electronic network traffic, customer traffic, resource usage, electronic signals (e.g., input or output) or frequency of user logins within a predefined geographic area.

Nodes may be any suitable size. For example, nodes may be a few millimeters in size. Nodes may be deployed in a wide variety of locations. For example, sensors may be deployed in military battlefields, industrial plants, in orchards, in clothing, automobiles, smartphones, jewelry or refrigerators. Sensors may be relatively inexpensive and have low energy consumption. Sensors may "sense" two or more stimuli or environmental attributes.

Nodes may implement two or more functions. For example, sensors may measure changes in their operating (physical or virtual) environment, capture data corresponding to the measured changes and store/communicate the captured data. Sensors may be accessed by other sensors or other nodes on the network.

A node may be an actuator. For example, based on data captured by a sensor, an actuator may respond to a detected event. Based on the capture and analysis of multiple sources of data (e.g., captured by sensors), an actuator may be instructed to take action autonomously, without human intervention.

The local data analysis engine on the mobile device, in accordance with principles of the invention, may be configured with machine learning capabilities. The local data analysis engine may also be based on artificial intelligence ("AI"). The local data analysis engine may be configured to determine applications that are commonly accessed by the user of the mobile device. Commonly accessed applications may be applications that may be accessed an amount of times greater than a pre-determined amount of access times. It should be appreciated that commonly accessed applications may refer to an application itself, and in some embodiments, may refer to modules and/or features of the application.

The local data analysis engine may be configured to develop an application behavior pattern for each commonly accessed application. The local data analysis engine may track a group of commonly accessed applications over a pre-determined amount of time. The local data analysis engine may also track, for each commonly accessed application, application data. The application data may include a start time of access to the application. The start time of access may be the precise time of day the user requests access to the application. The application data may also include frequency of access to the application. The frequency may include how frequently the user accesses the application. The frequency may be greater than the pre-determined amount of access times needed to be included in commonly accessed applications. The application data may also include real-time data needed when accessing the application. Real-time data may include login information to login to the application. Real-time data may also include other profile information. Real-time data may also include common products, items and information frequently being viewed by the user.

The local data analysis engine may store the application data on the mobile device.

The system may be configured to pre-load each of the commonly accessed applications at the time the user typically accesses the application. For each commonly accessed application, when a determined current time of day is a pre-determined amount of time prior to the tracked start time of access to the commonly accessed application, the system may begin pre-loading the application. The pre-loading may include triggering the plurality of sensors to authenticate the user.

The plurality of sensors on the mobile device may be configured to capture a plurality of attributes of the user. Each of the plurality of sensors may be configured to capture, autonomously, an attribute of the user necessary for authentication. Each sensor may be configured to capture a specific attribute. Sensors on the mobile device may include but are not limited to, motion sensors, voice recognition, facial recognition, voice detection, gps locator.

In response to the capture of an attribute, each sensor may be configured to compare a value of the captured attribute to a historically stored attribute value captured previously by the sensor and stored on the sensor. The sensor may validate the value of the captured attribute as being comparable and/or equal to the stored attribute value. When the sensor validates that the value is comparable, this may infer that the captured value is within a pre-set range of values that may authorize the attribute to be equal to the historically stored attribute value.

Following validation, each sensor may transmit a verification message to an edge-node on the mobile device. The verification message may include a validation of the attribute. The edge-node may be configured to pre-authenticate the user based on a receipt of at least two or more verification messages. Two or more verification messages may enable the edge-node to validate the user based on at least two validated attributes. The system may also use the stored encrypted password data to validate the user.

In some embodiments, attributes may be assigned a trust value. Applications are then assigned a required trust level. Pre-authentication may not occur until a user has established that the required trust is equal to the level of required trust that the application has defined. This trust may be extended to include the features and/or modules within the application. For example, pre-authentication could occur at a read-only level but in order to perform sophisticated transactions, further trust may be established through additional verification mechanisms.

The capturing of the attributes via the sensors may all be performed without any user input and without user knowledge. When the mobile device is within close proximity to the user of the mobile device, the sensors may detect and capture the attributes without the user's knowledge. The capturing of the attributes via the sensors may be performed independent of a formal request for user authentication.

In the event that the user is not within close proximity to the mobile device at the time the system would begin pre-authentication the sensors may not be able to sense and/or detect any motion. In this example, the system may be configured to delay pre-authentication. When the user comes within close proximity to the mobile device, the sensors may be configured to trigger pre-authentication.

Following pre-authentication, the system may be configured to pre-load the mobile device with the commonly accessed application. The pre-loading may be based, at least in part, on the stored application data. The pre-loading may include loading the exact webpage commonly accessed. The pre-loading may include pre-populating fields with data commonly requested from the application. The data may be real-time stored in the mobile device. The pre-loading may include pre-loading the commonly accessed application with a type of service and/or activity commonly performed on the commonly accessed application.

It should be appreciated that when the commonly accessed applications is an application that may not entail secure authentication, the pre-authentication may include retrieving user login information that may be stored as application data on the mobile device and may not entail requiring at least two validated attributes.

In another embodiment, an edge computing system located on a mobile device for pre-authenticating a user of the mobile device is provided. The system may include a plurality of sensors on the mobile device. The plurality of sensors may be configured to capture a plurality of attributes of the user.

Each of the plurality of sensors may be configured to capture, autonomously, an attribute of the user necessary for authentication. Each sensor may transmit a value of the captured attribute to an edge-node on the mobile device. The edge-node may be configured to verify the captured attribute value.

The system may also include a local data analysis engine on the mobile device. The edge-node may be the local data analysis engine. The edge-node may be a separate node for processing the data.

The local data analysis engine may be configured with machine learning capabilities and configured to track a group of commonly accessed applications over a pre-determined amount of time. The local data analysis engine may be configured to track, for each commonly accessed application, application data. The application data may include a start time of day of access of the application, frequency of access to the application, and real-time data needed when accessing the application. The local data analysis engine may be configured to store the application data on the mobile device.

The system may also include an administration engine. The administration engine may administrate and orchestrate activity of the local data analysis engine and/or the edge-node. The administration engine may be in communication with an authorizing server. The authorizing server may be configured to specify one or more requirements that the local data analysis engine may be required to meet in order to grant the requested access to the application.

For each commonly accessed application, when a determined current time of day is a pre-determined amount of time prior to the tracked start time of access to the commonly accessed application, the edge-node may be configured to pre-load the commonly accessed application on the mobile device. The pre-loading may include receiving the value of the captured attribute from each of the plurality of sensors. The pre-loading may further include determining, whether each value of the captured attribute correlates to a historically stored attribute value captured by the sensors and stored on the edge-node.

Following determining the correlation, the pre-loading may include authenticating the user and pre-loading the mobile device with the commonly accessed application, based at least in part, on the stored application data.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system architecture 100. Architecture 100 may represent an illustrative IoT network. Architecture 100 may include one or more nodes. Each node may include two or more nodes. Nodes may be linked to each other via network 106. FIG. 1 shows exemplary nodes 104 which include sensors and actuators. Nodes 104 may communicate with data analysis engine 108 and data repository 102. Data analysis engine 108 and data repository 102 may be included in a cloud computing environment.

Cloud computing environment may leverage data analysis engine 108 and data repository 102 to validate pre-authentication routines. Cloud computing environment may leverage data analysis engine 108 and data repository 102 to enable an autonomous and/or semi-autonomous authentication.

Sensors may include devices that detect changes in a physical or virtual environment. Sensors may measure changes in their native (physical or virtual) environment, capture data corresponding to the measured changes and store/communicate the captured data. Sensors may be accessed by other sensors or other network nodes. Sensors may transmit captured data to another node. Sensors may be included in edge-nodes such as a user's mobile device.

Actuators may respond to data transmitted or processed by other nodes, such as data analysis engine 108. Actuators may include devices that modify the physical state of a physical entity. Actuators may include devices that modify a virtual state of information. Actuators may move (translate, rotate, etc.) physical objects or activate/deactivate functionalities of physical objects. A single node may include the functions of sensors and actuators.

Generally, nodes on a network may interact and cooperate using one or more interaction paradigms. Exemplary interaction paradigms include master-slave, client-server and peer-to-peer interactions. As a result of the disparate nature of nodes 104, system architectures, such as architecture 100 incorporating nodes 104 may support a variety of communication protocols.

Nodes 104 may be produced by different manufacturers. Nodes 104 may capture data in different formats. For example, nodes 104 may use different data structures to store captured data. Nodes 104 may utilize different communication protocols to transmit captured data or communicate with other nodes. Despite such operational differences, nodes 104 may be configured to operate substantially seamlessly together.

Nodes 104 may belong to, or be operated by, different administrative/management domains. Nodes 104 may be operated by different domains without expressly-defined relationships among such domains. One of nodes 104 may control data gathering or actuation of another of nodes 104. Interoperability of nodes 104 may allow captured data to be substantially seamlessly captured and interpreted by data analysis engine 108 (or other nodes). Based on interpreting the captured data, data analysis engine 108 may issue instructions to nodes 104.

Data gathering by one or more of nodes 104 may be controlled by one or more other nodes. For example, data analysis engine 108 may control a quantity and/or quantity of data captured by nodes 104. Data repository 102 and/or analysis engine 108 may filter or otherwise intelligently process data captured by nodes 104. For example, data analysis engine 108 may determine whether biometric credentials sensed by nodes 104 match credentials stored in data repository 102.

Timing of when data is captured by nodes 104 may be controlled by any suitable node of architecture 100. For example, data may be captured in real-time or at predefined intervals such as once a day. Data may also be captured in response to a detected environmental status change.

Data analysis engine 108 may repackage or reformat captured data. Data conversion may include encapsulating or applying a normalized communication protocol. Data conversion may include transformation of low level raw data (possibly from multiple sensors or groups of sensors) into meaningful information for a specific audience or for a specific analysis.

Data repository 102 may receive data captured by nodes 104. Data stored in repository 102 may be sorted and analyzed by data analysis engine 108. Data analysis engine 108 may perform pattern recognition on data stored in data repository 102. Data analysis engine 108 may identify correlations and trends in captured data. Illustrative patterns may include validating a threshold number of pre-authentication routines. In some embodiments, data captured by nodes 104 may be transmitted directly to data analysis engine 108.

Data stored in data repository 102 may be so voluminous and complex (e.g., structured/unstructured and/or constantly changing) that traditional data processing application software may be inadequate to meaningfully process the data (e.g., "big data"). Data analysis engine 108 may include software applications specially designed to process large volumes of data ("big data analytics").

Architecture 100 may include one or more layers of software applications. Software applications may implement a variety of functions and provide varied services to nodes of architecture 100. Software applications running on data analysis engine 108 may submit requests to nodes 104 for retrieval of specific data to achieve a functional goal. Software applications may control data captured by nodes 104 or actions taken by nodes 104. Software applications may provide security services that mitigate threats to the integrity of data transmitted or stored by sensors 104 or architecture 100 generally.

Nodes 104 positioned relatively close to a source of captured data and having sufficient computational power to process captured data may be termed "edge-nodes." Edge-nodes may integrate sensing capabilities, actuating capabilities, data connectivity and/or computing capacities. Edge-nodes may control sensors, actuators, embedded devices and other nodes. Edge-nodes, or the nodes they control, may not be continuously connected to a network. Edge-nodes may provide increased computational resources positioned near the source of captured data. Processing data using edge-nodes may reduce communication bandwidth needed to transmit captured data from a node to a cloud computing environment for processing.

Nodes 104 may be grouped. Nodes may be grouped based on physical proximity or based on proximity to an edge-node. An edge-node may create and/or be included in a node group. An edge-node may manage and coordinate inter-node communications for members of a node group.

Figure 2:
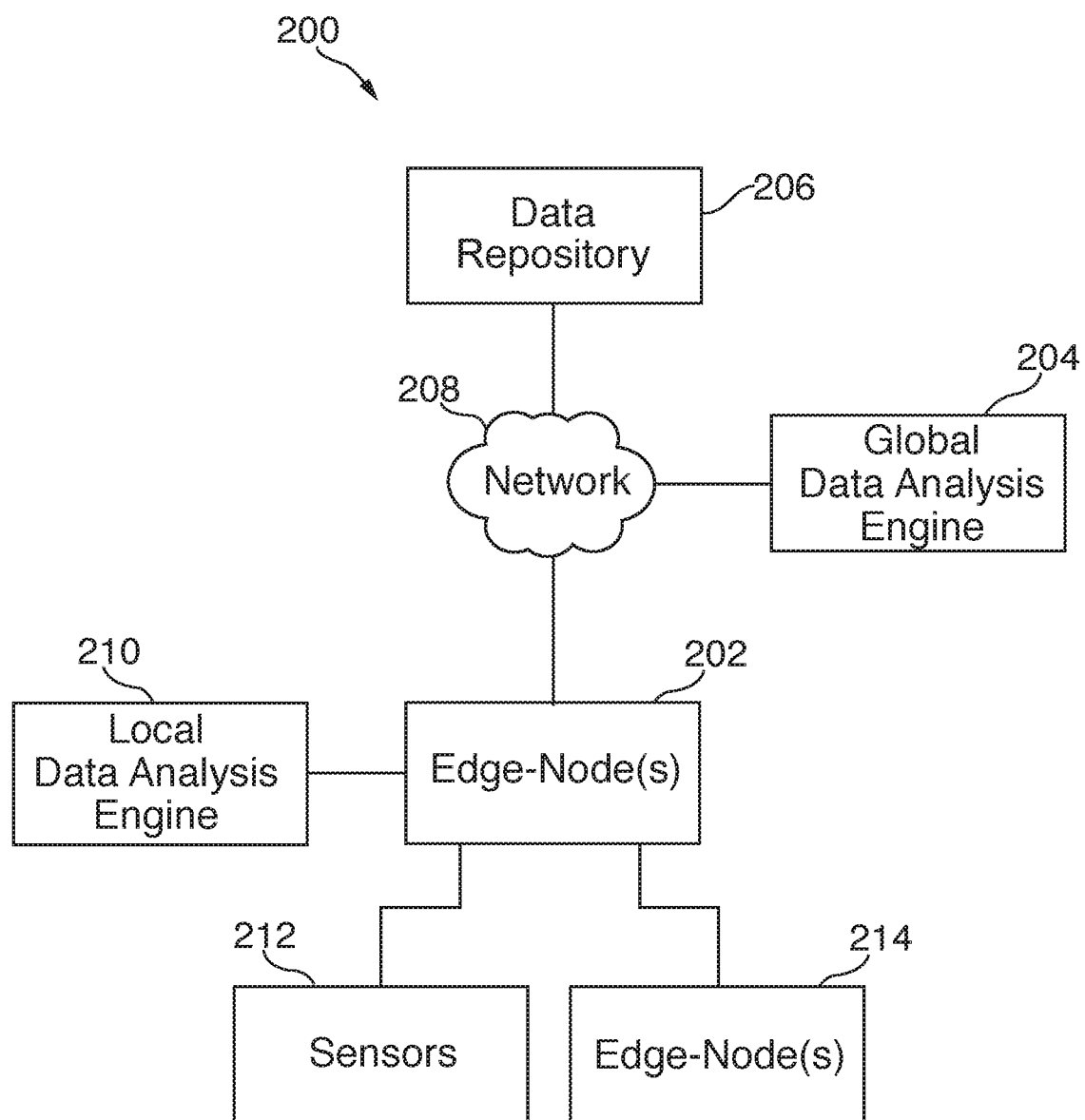
FIG. 2 shows illustrative system components in accordance with principles of the invention.

FIG. 2 shows illustrative system architecture 200. System 200 includes data repository 206 and data analysis engine 204. Data repository 206 and data analysis engine 204 may be provided, in some embodiments, by a cloud computing environment. Data repository 206 may store data captured by sensors 212 and generated by actuators 214. In some embodiments, the data analysis engine may be global. In some embodiments, the data analysis engine may be local.

System 200 includes edge-node(s) 202. Edges-node(s) 202 may be configured to receive data from sensors 212 and issue instructions to actuators 214. Illustrative sensors 212 may include sensors that capture geographic location, biometric credentials (e.g., facial recognition, retina scan, fingerprint information) or transactional activity.

Edge-node(s) 202 may process data captured by sensors 212 using local data analysis engine 210. For example, edge-node(s) 202 may perform a plurality of pre-authentication routines by authenticating attributes captured by sensors 212. Based on data captured by sensors 212, edge-node(s) 202 may be configured to authenticate the user. Based on data captured by sensors 212, edge-node(s) 202 may be configured to establish a pre-authentication of the user of the mobile device.

In some embodiments, the cloud computing environment may execute a consensus protocol that coordinates data analysis performed by edge-nodes 202. Cloud computing environment may communicate with edge-node(s) 202 using network 208.

Cloud computing environment may leverage data analysis engine 204, data repository 206 and data processing results of edge-node(s) 202 to validate pre-authentication routines performed by edge-nodes.

Figure 3:
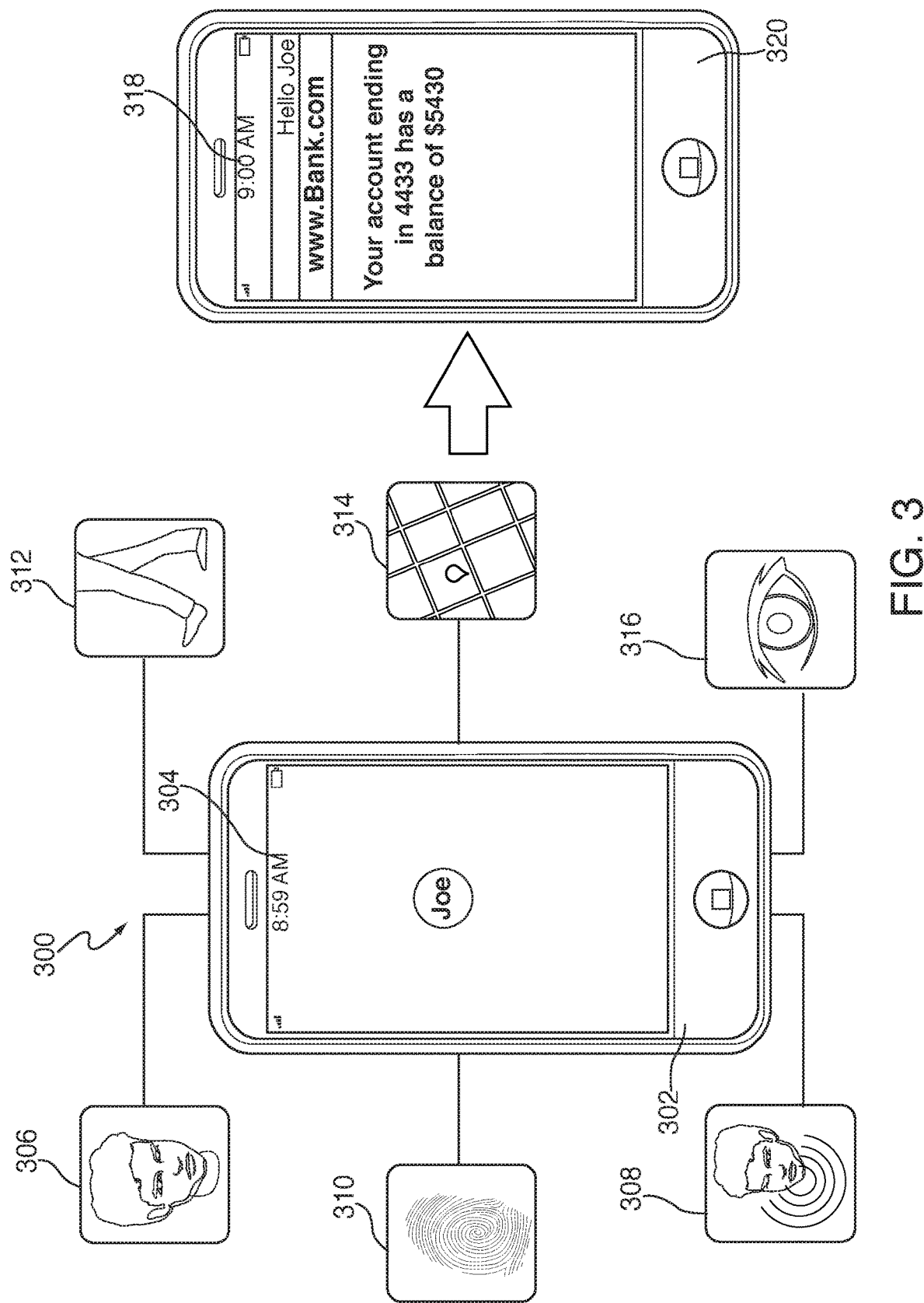
FIG. 3 shows an illustrative exemplary scenario in accordance with principles of the invention.

FIG. 3 shows an illustrative exemplary diagram 300 for pre-authenticating a user on the user's mobile device. Diagram 300 may be an example of a commonly accessed application of the user being activated at a specific time. The activating of the application on the mobile device 302 may be activated based on stored data associated with the commonly accessed application. The stored data may be generated and stored by a local data analysis engine on the user's mobile device. Details associated with the stored data may be shown at FIG. 4.

In this example, the user of the mobile device 302 may typically access a banking application associated with the user's bank accounts at a certain time of day. Typically, at the start of the user's workday, the user logs onto the web application of the bank. The local data analysis engine on the mobile device may have tracked, over a pre-determined amount of time, the precise time the user accesses the bank's web application. The tracked time for accessing the bank's application may be 9:00 am.

The time displayed on the user's mobile device is 8:59 am, as shown at 304. The edge computing system, in accordance with principles of the invention, may be configured to trigger the smart sensors on the user's mobile device to capture attributes of the user in order to be enabled to authenticate the user prior to 9:00 am. The capturing of each of the attributes may be done without the knowledge of the user. The capturing may be done automatically and may not entail any user input.

A facial recognition sensor on the mobile device may capture an image of the user, as shown at 306. The user may be holding the device. The user may be in close proximity of the device. The captured image may be compared to a stored facial image of the user stored on the smart sensor.

A fingerprint recognition sensor may scan a fingerprint of the user as shown at 310. The scanning may be performed while the user may be touching the keypad on the device. The scanning may be performed while the user may be tapping a link or button displayed on the device. The fingerprint scan may be compared to a stored fingerprint of the user stored on the smart sensor.

A voice detector may detect the voice of the user, as shown at 308. The voice may be captured and/or detected while the user is involved in a telephone conversation. The voice may be captured while the user is in a conversation with another person not connected to the mobile device. The voice may be compared to a stored voice of the user on the smart sensor.

A motion sensor may detect the body movement of the user, as shown at 312. The body movement may be associated with a hand movement, legs movement, and/or steps per minute of the user.

A gps locator may be embedded on the mobile device and may be configured to detect the location of the mobile device, as shown at 314. The gps locator may communicate with the facial recognition sensor to confirm the validity of the user and then based on the location of the mobile device and the confirmed user, validate the location.

An eye recognition sensor, as shown at 316, may be configured to perform an iris scan. The eye recognition sensor may include a camera that can capture minute and intricate details of the iris with great accuracy. The details of the iris may be compared to stored details of the user's iris in order to authenticate the user.

Following validation, the smart sensors may transmit an authentication message to an edge-node on the mobile device. The edge-node may process and authenticate the user based on at least two validated attributes. The user may be authenticated based further on stored encrypted passwords of the user for the application.

It should be appreciated that in the event that one or more sensors cannot validate the attribute based on stored attribute data, the edge computing system may be configured to trigger other biometric sensors within the mobile device to detect an attribute that may be used in a two or more factor authentication in order to validate the user. Other biometric sensors may include body temperature detection. Another sensor may sense the gait of the user. A gait of the customer may correspond to a known gait associated with the user and stored on the sensor. A gait may be determined by a pedometer embedded in the smartphone.

In some embodiments, the system may leverage a truly "multi" factor authentication system. In such a system we use as many factors as is necessary to establish the level of trust required for the actions that the user/device is trying to take. Thus, a dynamic and multi-factored trust establishment is invoked. Furthermore, the system is not limited to only a few factors when more are available. The additional factors provide us a better understanding of trustworthiness.

The system may be configured to confirm at least two attributes of the user to be valid prior to pre-loading a commonly accessed application.

According to this exemplary diagram 300, the system may validate the user and may further pre-load the web application associated with the bank at the time the user typically would be attempting to login to the bank's web application. The time shown on the user's mobile device 320 may be 9:00 am, as shown at 318. The user's mobile device 320 may pre-load the web page displaying the user's account balance at 9:00 am. The page may be displayed without requiring the user to login with a username and password. The page may be displayed without the user knowingly inputting any biometrics. The user's username and password may have been stored on the user's mobile device along with the specific webpage the user accesses, based on the tracking of commonly accessed applications over a pre-determined amount of time via the local analysis data engine.

FIG. 4 shows an illustrative diagram of a data-set 400 associated with three commonly accessed applications. The data may be generated by the local data analysis engine on the user's mobile device over a pre-determined amount of time.

The diagram displays the data generated based on a three day analysis. The data-set 400 displayed in the diagram may be stored on the user's mobile device. At the time the system may want to pre-load one of the commonly accessed applications, all the data may be at the edge and may enable faster loading time.

In addition to providing faster loading time based on sensed and confirmed attributes, processing data using edge-nodes may reduce communication bandwidth requirements and improve overall data transfer time across a network. Furthermore, less frequent data transmissions may enhance security of data gathered by nodes. Frequent data transfers may expose more data to more potential security threats. For example, transmitted data may be vulnerable to being intercepted en-route to a cloud computing environment.

Data-set 400 may include information associated with application 1 at row 402, application 2 at row 404 and application 3 at row 406. Application 1, 402, is a bank application. The bank application may be the bank's website. The bank application may be a mobile app. The local data analysis engine may monitor the time 408 that the user accesses the application. The local data analysis engine may monitor the frequency 410 of accessing the application. The frequency may indicate how often the user accesses the application. Some applications may be accessed a few times a day. Some applications may be accessed once every day. Some applications may be accessed only once a week and/or bi-monthly.

The local data analysis engine may further store the link to the application as shown at 412. The local data analysis engine may also store specific data 414 that the user may need each time the application is accessed. Typically this may be a user-name and password. The data may also include an account number. In some applications, the data may also include a location, specific items commonly purchased and other forms of data, the data may be encrypted using secure encryption algorithms known to those skilled in the art.

Application 1, 402, may be loaded by the user at the start of the user's day. The time may not be exactly the same each day but may be within a few minutes. The system may take the times over the pre-determined time the applications were tracked and may take the average time of access as the time the system may pre-load the application.

The local data analysis engine may determine at column 410, row 402 that the user accesses the application 1 daily. Furthermore the local data analysis engine stores the application at column 412, row 402. The application 1 may be a bank application and may more specifically be the account balance web page within the bank's application. The bank application typically requests the username, the password and the user's account number. The local data analysis engine may store the data, as shown at column 414, row 402, to enable the system to quickly extract the login information when pre-loading the application to the user's mobile device.

Application 2 at row 404 may also be tracked at the same time. Application 2 may be a weather application as shown at column 412, row 404. The user may typically access the application at the end of his day as shown at column 408, row 404. The local data analysis engine may store the data the user may need to generally input when requesting the weather application. The data may include the location where the user desires to see the weather. The data may also include the way user prefers the weather to be displayed. The user, in this example typically selects the hourly weather display.

This stored data may be extracted at the time the application may be pre-loaded to the user's mobile device and may automatically display the weather of the requested city without user input of the city name. Furthermore, the weather application may be displayed as an hourly weather display without the user having to click on the display settings options.

Application 3 at row 406 may be an application to a grocery the user commonly shops at. Application 3 may be accessed at the later part of the data, as shown at column 408, row 406. In this example, the user may only access application 3, 406, once a week. The data that may be stored for the application 3, 406, may include the user's login information and may also include the products the user commonly purchases.

Figure 5:
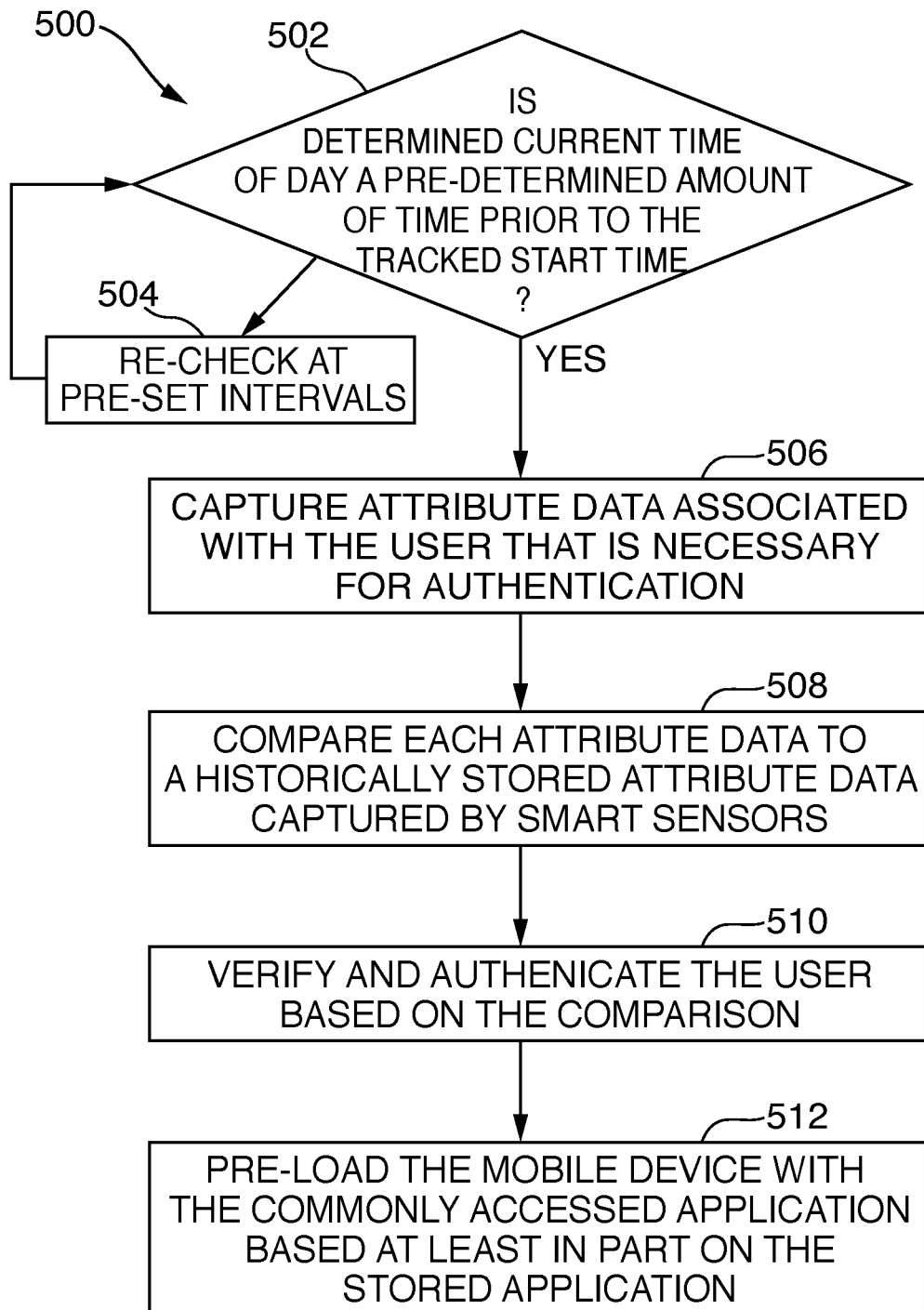
FIG. 5 shows an illustrative flowchart in accordance with principles of the invention.

FIG. 5 shows an illustrative flowchart 500 describing the edge computing system for the process of pre-authenticating the user in order to pre-load a commonly accessed application at the time the user commonly accesses the application.

The system, at 502 may determine whether the current time of day is a pre-determined amount of time prior to the tracked start time of one or more commonly accessed applications. The pre-determined amount of time may be equal to an average computer processing time it may take for the system to authenticate the user and load the application. The system may be continuously monitoring the time of day. The system may monitor the time of day repeatedly, at a pre-set interval of time. If the time is not the pre-determined amount of time prior to the tracked start time, the system may re-check the time of day at the pre-set interval, as shown at step 504.

When the time is the pre-determined amount of time, the system may trigger the sensors to capture attribute data associated with the user that may be necessary for authentication, as shown at step 506. The system may then compare each captured attribute data to historically stored captured attribute data that the smart sensors may have captured, as shown at step 508. The system may further verify and authenticate the user based on the comparison, as shown at 510.

Following authentication of the user of the mobile device to the application, the system may pre-load the mobile device, as shown at step 512, with the one or more commonly accessed applications that is typically accessed by the user at the time.

The process of pre-authenticating the user to the application and pre-loading the application on the mobile device may all occur at the edge of the device. The processing may all occur within the mobile device itself. The processing time it may take from step 502 to and including step 512 may be between 0.01 milliseconds and three seconds. In some embodiments the processing time may be between 1.5 seconds and 2.5 and other pre-determined ranges of processing time.

Thus, methods and apparatus for pre-authenticating a user to one or more commonly accessed application and pre-loading the one or more commonly accessed applications to the mobile device are provided. Persons skilled in the art will appreciate that the present invention can be practiced by other than the described embodiments, which are presented for purposes of illustration rather than of limitation, and that the present invention is limited only by the claims that follow.

What is claimed is:

1. An edge computing system located on a mobile device for pre-authenticating a user of the mobile device, the system comprising:
 a plurality of sensors on the mobile device configured to capture a plurality of attributes of the user;
 a local data analysis engine on the mobile device, configured with machine learning capabilities and configured to:
  track a group of commonly accessed applications over a pre-determined amount of time;
  track, for each commonly accessed application, application data comprising a start time of access of the application, frequency of access to the application, and real-time data needed when accessing the application; and
  store the application data on the mobile device;
 wherein, for each commonly accessed application, when a determined current time of day is a pre-determined amount of time prior to the tracked start time of access to the commonly accessed application, each of the plurality of sensors are configured to:
  capture, autonomously, an attribute of the user necessary for authentication; and
  transmit a value of the captured attribute to an edge-node on the mobile device to verify the captured attribute data;
 in response to the transmittal of the value of the captured attribute from each of the plurality of sensors, the edge-node is configured to pre-load the commonly accessed application on the mobile device, the pre-loading comprising:
  receiving the value of the captured attribute from each of the plurality of sensors;
  determining, whether each value of the captured attribute correlates to a historically stored attribute value captured by the sensors and stored on the edge-node; and
  following determining the correlation:
  authenticating the user; and
  pre-loading the mobile device with the commonly accessed application, based at least in part, on the stored application data.

2. The system of claim 1 wherein the pre-loading further comprises pre-loading the commonly accessed application:
 with a type of service and/or activity performed on the commonly accessed application; and
 with the real-time data stored in the mobile device required for the type of service and/or activity performed on the commonly accessed application.

3. The system of claim 1 wherein the plurality of attributes comprise two or more of facial recognition, fingerprint recognition, body movement and geographic location.

4. The system of claim 1 wherein the autonomous capture of each attribute from the user via the sensors comprises, capturing the attribute independent of known user input.

5. The system of claim 1 wherein the autonomous capture of the attribute via the sensors comprises capturing attribute data independent of a formal request for user authentication.

6. The system of claim 1 wherein the mobile device is one or more of a smartphone, smartwatch, laptop and tablet.

7. The system of claim 1 wherein the tracking over the pre-determined amount of time enables developing a behavior pattern for the user for each commonly accessed application.

8. The system of claim 1 wherein each sensor is a smart sensor comprising a sensor, a microprocessor and wireless communication capabilities.

9. A method for pre-authenticating a user on the user's mobile device, the method using a plurality of sensors located on the user's mobile device, the method comprising:
 tracking a group of commonly accessed applications over a pre-determined amount of time;
 tracking, for each commonly accessed application, application data comprising a start time of day the user accesses the application, frequency of access to the application, and real-time data needed when accessing the application; and
 storing the application data on the user's mobile device;
 wherein, when a determined current time of day is a pre-determined amount of time prior to the tracked start time of access to a one or more commonly accessed applications, the method further comprises:
  capturing, autonomously, via each sensor, an attribute associated with the user, necessary for authentication;
  comparing, a value of the attribute captured by each sensor to a historically stored attribute value previously captured by each sensor;

verifying and authenticating the user based on the comparing; and pre-loading the user's mobile device with the commonly accessed application, the pre-loading based at least in part, on the stored application data.

10. The method of claim 9 wherein each sensor is a smart sensor comprising a sensor, a microprocessor and wireless communication capabilities.

11. The method of claim 9 wherein the capturing autonomously of each attribute associated with the user via the sensors comprises, capturing the attribute independent of known user input.

12. The method of claim 9 wherein the pre-determined amount of time is between 0.01 millisecond and three seconds.

13. The method of claim 9 wherein the pre-determined amount of time is between 1.5 seconds and 2.5 seconds.

14. The method of claim 9 wherein the plurality of attributes comprise two or more of facial recognition, fingerprint recognition, body movement and geographic location.

15. An edge computing system located on a user's mobile device for pre-authenticating a user on the mobile device, the system comprising:

a plurality of sensors on the mobile device;

a local data analysis engine on the mobile device, configured with machine learning capabilities and configured to:

track a group of commonly accessed/requested applications over a pre-determined amount of time;

track, for each commonly accessed application, application data comprising a start time of access of the application, frequency of access to the application, and real-time data needed when accessing the application; and store the application data on the mobile device;

wherein, for each commonly accessed application, when a determined current time of day is a pre-determined amount of time prior to the tracked start time of access to the commonly accessed application:

the plurality of sensors on the mobile device are configured to capture a plurality of attributes of the user, wherein each of the plurality of sensors are configured to:

capture, autonomously, an attribute of the user necessary for authentication;

compare a value of the captured attribute to a historically stored attribute value captured previously by the sensor and stored on the sensor;

validate the value of the captured attribute as being equal to the stored attribute value; and transmit a verification message to an edge-node on the mobile device, the verification message comprising a validation of the attribute;

the edge-node configured to:

authenticate the user based on a receipt of at least two or more verification messages; and pre-load the mobile device with the commonly accessed application, based at least in part, on the stored application data.

16. The system of claim 15 wherein each sensor is a smart sensor comprising a sensor, a microprocessor and wireless communication capabilities.

17. The system of claim 15 wherein the mobile device is one or more of a smartphone, smartwatch, laptop and tablet.

18. The system of claim 15 wherein the plurality of attributes comprise two or more of facial recognition, fingerprint recognition, body movement and geographic location.

19. The system of claim 15 wherein the autonomous capture of each attribute from the user via the sensors comprises, capturing the attribute independent of known user input.

20. The system of claim 15 wherein the autonomous capture of the attribute via the sensors comprises capturing attribute data independent of a formal request for user authentication.

* * * * *